United States Patent [19]

Wolff et al.

[11] Patent Number: 5,159,009
[45] Date of Patent: Oct. 27, 1992

[54] CARBON BLACKS MODIFIED WITH ORGANOSILICON COMPOUNDS, METHOD OF THEIR PRODUCTION AND THEIR USE IN RUBBER MIXTURES

[75] Inventors: Siegfried Wolff, Bornheim-Merten; Udo Görl, Meckenheim, both of Fed. Rep. of Germany

[73] Assignee: Degussa, Fed. Rep. of Germany

[21] Appl. No.: 716,108

[22] Filed: Jun. 17, 1991

[30] Foreign Application Priority Data

Jul. 25, 1990 [DE] Fed. Rep. of Germany ....... 4023537

[51] Int. Cl.$^5$ .................................................. C09C 1/44
[52] U.S. Cl. ................................... 524/495; 524/572; 524/575.5; 525/332.5; 106/287.1; 106/287.11; 106/287.13; 106/287.14; 106/287.15; 106/287.16; 106/472; 106/473; 106/475
[58] Field of Search ........... 106/287.1, 287.11, 287.13, 106/287.14, 287.15, 287.16, 472, 473, 475

[56] References Cited

U.S. PATENT DOCUMENTS

| | | | |
|---|---|---|---|
| 3,227,675 | 1/1966 | Papalos | 106/487 |
| 4,128,438 | 5/1978 | Wolff et al. | 106/287.16 |

Primary Examiner—Mark L. Bell
Assistant Examiner—Scott L. Hertzog
Attorney, Agent, or Firm—Cushman, Darby & Cushman

[57] ABSTRACT

Carbon black is reacted with at least one organosilicon compound of the General Formula $$[R^1{}_n(RO)_{3-n}Si\text{-}(Alk)_m\text{-}(Ar)_p]q\,[B] \quad (I)$$

$$R^1{}_n(RO)_{3-n}Si\text{-}(Alkyl) \quad (II)$$

or $$R^1{}_n(RO)_{3-n}Si\text{-}(Alkenyl) \quad (III),$$

and any excess of said organosilicon compound is extracted with a solvent. The products are useful as active fillers in rubber mixtures, carbon black suspensions and plastic mixtures which can be cross-linked with sulfur or peroxide.

7 Claims, No Drawings

CARBON BLACKS MODIFIED WITH ORGANOSILICON COMPOUNDS, METHOD OF THEIR PRODUCTION AND THEIR USE IN RUBBER MIXTURES

The present invention relates to the production of (carbon) blacks chemically modified on the surface with organosilicon compounds, to these modified fillers themselves and to their use in vulcanizable rubber mixtures, plastic mixtures and suspensions of blacks.

SUMMARY OF THE INVENTION

The treatment of an oxide surface with organosilicon compounds containing alkoxy groups has long been known (see U.S. Pat. No. 3,227,675 and European Patent EP 177,674 and EP 0,126,871). The goal of all these efforts was and is to generate a bond between the inorganic component, the oxide filler, whether it be e.g. glass or also silicate fillers such as those used e.g. in the rubber industry (precipitated and pyrogenic silicas, clays, aluminum silicates, etc.), and an organic polymer of very different chemical composition. As a rule, this results in an improvement of the properties of the vulcanizate. Carbon blacks, e.g. furnace blacks, lampblacks and gas blacks, are not included among the oxide fillers. The reaction which occurs in the case of these substances between the alkoxysilyl groups and the OH groups on the surface can not take place on carbon black and therefore seems to make the building up of a chemical bond between carbon blacks and organosilicon compounds impossible.

German patent DE 27 47 277 ($\approx$ U.S. Pat. No. 4,128,438) discloses granulated mixtures of carbon black and organosilicon compounds; however, they are only used to work the organosilicon compound into silica-containing rubber mixtures in a more effective manner. In this case, the carbon black is only a carrier for liquid organosilanes in order to convert them into the solid state. The silane can be removed from such mixtures by means of extraction with organic solvents and therefore are not chemically bonded to the carbon black.

After repeated attempts to adjust the properties of black-filled rubber vulcanizates via the use of blacks of differing structure and differing size of the specific surface, the problem of improving the properties of the vulcanizate via the addition of silane-modified blacks remains.

SUMMARY OF THE INVENTION

It has now been found that, if a suitable procedure is used, not inconsiderable amounts of organosilicon compounds can be bonded to the carbon black, depending on the surface and the structure of the carbon black and also on the selection of the organosilicon compounds.

Therefore, in accordance with the present invention, carbon blacks are chemically modified with one or more organosilicon compound(s) of the General Formulas $$[R^1{}_n (RO)_{3-n} \text{Si-(Alk)}_m\text{-(Ar)}_p]q [B] \quad (I)$$

$$R^1{}_n (RO)_{3-n}\text{Si-(Alkyl)} \quad (II)$$

or $$R^1{}_n (RO)_{3-n} \text{Si-(Alkenyl)} \quad (III)$$

in which

B represents —SCN, —SH, —Cl, —NH$_2$ (if q=1) or —S$_x$— (if q =2),

R and R$^1$, which may be the same or different, represent an alkyl group containing 1 to 4 carbon atoms, the phenyl group, q represents 1 or 2 n represents 0 1 or 2,

Alk represents a bivalent straight or branched hydrocarbon group containing 1 to 6 carbon atoms, m represents 0 or 1, Ar represents an arylene group containing 6 to 12 carbon atoms, preferably 6 to 8 carbon atoms, p represents 0 or 1 provided that p and n do not simultaneously signify 0, x represents a number from 2 to 8, Alkyl represents a monovalent straight or branched unsaturated hydrocarbon group containing 1 to 20 carbon atoms, preferably 1 to 6 carbon atoms, Alkenyl represents a monovalent straight or branched unsaturated hydrocarbon group with 2 to 20 carbon atoms, preferably 2 to 6 carbon atoms, and on the surface of which blacks 0.1 to 15 % by weight of one or more of the named organosilicon compounds are bonded in such a manner that they cannot be extracted with an organic solvent, especially diethyl ether. The indication of % by weight refers to the total weight of the modified black.

The invention also provides a method of producing these modified blacks in which a homogeneous mixture of one or more organosilicon compounds according to General Formula I, General Formula II or General Formula III is produced with the carbon black in a vessel, the components of the mixture are subsequently reacted with each other for 1 to 60 minutes at 50° to 160° C. in the mixing vessel itself or in another suitable tempering unit, e.g. a tempering bed, and then the organosilicon compound(s) which is (are), if applicable, not reacted is (are) extracted with an organic solvent.

Suitable carbon blacks are the types of the various classes known in the rubber art, e.g. furnace blacks, (division according to ASTM D 1765), lampblacks and gas blacks as well as non-rubber blacks.

Depending on the reaction, they can be used in powder form (fluffy), pellet form or as a granulate, depending on the purpose.

It has been found that the amount of organosilicon compound(s) which can be maximally bound to the particular black and can thus no longer be extracted by means of organic solvents, especially diethylether, also provides the optimum rubber-technology performance which can be achieved for the particular carbon black and organosilicon compound. Extractable amounts of this compound (these compounds) which exceed this amount not only do not result in any further improvement of the properties of the vulcanizate but on the contrary result in a worsening of the rubber-technology properties.

In order to be able to avoid the extraction of the excess amounts of organosilane, which is otherwise logical for the reasons cited, the amount of the organosilicon compound(s) which can be bound in alternating amounts as a function of the particular substances used is determined.

Then, when the method of the invention is carried out on an industrial scale, only the amounts determined to be required for the reaction with the carbon black in this manner are used.

The indication in % by weight refers to the compound(s) to be used in accordance with General Formulas I to III. The reaction product produced in powder form can subsequently be pelletized or granulated according to known methods if this appears to be advantageous for the intended use.

The invention also provides vulcanizable rubber mixtures containing carbon blacks modified with organosilane compounds in accordance of the invention. For this purpose, the term "vulcanizable rubber" refers to rubber which can be cross-linked with sulfur or also with peroxide.

The reaction products of the invention are added to the rubber mixture in an amount of 5 to 400 parts, relative to 100 parts rubber, especially 20 to 200 parts, relative to 100 parts rubber.

In comparison to mixtures with untreated carbon blacks, use of the modified carbon blacks of the invention results among other things in a distinct improvement of the moduli, the elasticity, the dynamic properties and the loss angle tan $\delta$. The rubber properties also are improved in comparison with the use of carbon black/organosilicon compound mixtures.

As noted above, suitable types of rubber include rubbers which can be cross-linked with sulfur and vulcanization accelerator(s) but also with peroxide to produce elastomers as well as mixtures of these rubbers. This includes the so-called diene elastomers, e.g. oil-extended natural and synthetic rubbers such as natural rubbers, terpolymers of ethylene, propylene and non-conjugated dienes. Also useful are copolymers of ethylene and propylene as well as carboxyl rubbers, epoxy rubbers, transpolypentamer, halogenated butyl rubbers, rubbers of 2-chlorobutane diene, ethylvinyl acetate copolymers, optionally also chemical derivatives of natural rubber as well as modified natural rubbers.

Rubber mixtures containing the silane-modified carbon blacks of the invention can contain other components which are customary in the rubber industry such as e.g.:

Additional reinforcing systems, that is, furnace blacks, channel blacks, lampblacks, thermal blacks, acetylene blacks, arc blacks, CK blacks, etc. as well as synthetic fillers such as silicas, silicates, aluminum oxide hydrates, calcium carbonates, natural fillers such as clays, siliceous chalks, chalks, talcums, etc. as well as silane-modified white fillers. However, the total amount of the fillers, including the modified carbon blacks, should not exceed the previously indicated upper limits of 400 and 200 parts per 100 parts rubber.

Conventional vulcanization accelerators used in the rubber industry (e.g. sulfenamides, 2-mercaptobenzothiazol (MBT), di-2-benzothiazyl disulfide (MBTS), triazine accelerator, thiurames) alone or in a mixture in amounts of 0.1 to 10 parts by weight relative to 100 parts by weight rubber.

Vulcanization retarders such as e.g. Vulkalent E, di-(phenylthio)acetamide (PVI), likewise in amounts of 0.1 to 10 parts by weight relative to 100 parts by weight rubber.

Zinc oxide and stearic acid as vulcanization promoters in amounts of 0.5 to 10 parts by weight relative to 100 parts by weight rubber.

Antioxidant agents, antiozonants and anti-flexcracking antioxidants used in the rubber industry such as e.g. N-isopropyl-N,-phenyl-p-phenylene diamine (IPPD), poly-2,2,4-trimethyl-1,2-dehydroquinoline (TMQ) as well as waxes as light stabilizers and their blends.

Softeners such as e.g. aromatic, naphthenic, paraffinic, synthetic softeners and their blends.

Optional silanes such as e.g. bis(3-triethoxysilylpropyl) tetrasulfane, $\gamma$-chloropropyltriethoxysilane, $\gamma$-mercaptopropyltrimethoxysilane, vinyltrialkoxysilanes and their blends in an amount of 0.1 to 20 parts by weight, preferably 1 to 10 parts by weight per 100 parts by weight filler.

Optional sulfur in an amount of 0.1 to 10 parts by weight per 100 parts by weight rubber.

Optional dyes and auxiliary processing agents in the customary amounts.

The mixture may be made in a manner known in the rubber industry in a closed mixer or on an open roll mill.

The silane-modified carbon blacks of the invention may be used in mixtures such as those customarily used in tire construction, e.g. in the belt, carcass and bead area, in sidewall mixtures and adhesive mixtures as well as to industrial articles such as e.g. conveyor belts, V-belts, hoses, seals, engine mounts, suspension and damping elements and rubber-coated fabrics.

| Test methods for use: | Test method |
|---|---|
| Rheometer | DIN 53 529 |
| Mooney test | DIN 53 524 |
| Tensile strength | DIN 53 504 |
| Breaking elongation | DIN 53 507 |
| Modulus 100%, 200%, 300% | DIN 53 507 |
| Tear resistance | DIN 53 507 |
| Firestone Ball Rebound | AD 20 245 |
| Shore A hardness | DIN 53 505 |
| Abrasive wear | DIN 53 516 |
| Goodrich flexometer | ASTM D 623-62 |
| Heat buildup | DIN 53 513 |
| MTS | DIN 53 5/3 |

| Initial and raw materials used: | |
|---|---|
| Buna ® AP 451 | EPDM |
| RSS 1 | ribbed smoked sheet (natural rubber) |
| SMR CV | standard Malaysian rubber (constant viscosity) |
| Naftolen ZD | aromatic softener |
| Sunpar 2280 | paraffinic softener |
| Protector ® G35 | antiozone wax |
| Structol ® 60 NS | homogenizing resin |
| Vulkanox ® HS | 2,2,4-trimethyl-1,2-dihydroquinoline |
| Vulkanox ® 4010 | N-isopropyl-N'-phenyl-p-phenylene diamine |
| Vulkacit ® MOZ | benzothiazyl-2-sulfenmorpholide |
| Vulkacit ® L | zinc-N-dimethyl-dithiocarbamate |
| Vulkacit ® CZ | benzothiazyl-2-cyclohexylsulfenamide |
| Vulkacit ® DM | dibenzothiazyl disulfide |
| Si 69 | bis(3-triethoxy-silylpropyl)-tetrasulfane |
| Si 264 | 3-thiocyanatopropyl-triethoxysilane |
| Si 230 | 3-chloropropyl-triethoxysilane |
| Si 221 | 3-butenyltriethoxysilane |

I. Example of the production of silane-modified carbon blacks 500 g CORAX ® N110 (140 $m^2/g$ BET surface) are filled into a Henschel F.M. 40 liter mixing unit equipped with a two-piece variant mixing mill with a horn, a baffle mounted in the cover and comprising a temperature meter, with a ventilation and a hollow jacket for tempering by means of vapor or water.

1st stage: After the cover has been closed, the speed of the mixing mill is brought to 2,600 rpms. 60 grams of Si 69 are sprayed at room temperature (approximately 20° to 25° C.) onto the filler, the mixture is homogenized and subsequently it is removed from the mixer.

2nd stage: After the mixer has been heated to 120° C., the mixing material from stage 1 is filled back into the mixer and the mixer speed is brought to 2,600 rpms. When a temperature of 130° C. has been reached, the mixing unit is turned off and emptied after a total dwell time of 10 minutes.

The method is identical for all carbon blacks and silanes used in the following examples.

II. Determination of the amount of silane which can be bonded to carbon black 150 g of the carbon black/silane product produced according to Example 1 are extracted for 24 hours with 500 ml dry ether under reflux by means of a Soxlett apparatus. This method removes the amount of silane not reacted with the carbon black. After the drying of the carbon black/silane product treated in this manner in a water-jet vacuum at 40° C., the amount of silane bonded to carbon black is quantitatively determined. The analytical method used depends on the type, that is, the chemical structure, of the silane applied.

In order to determine the concentration, a determination of polysulfide is carried out in the case of polysulfidic silanes (e.g. bis(3-triethoxysilylpropyl) tetrasulfane), a determination of sulfur according to DIN 53 584 in the case of sulfur-containing silanes (e.g. γ-mercaptotrimethoxypropylsilane, 3-thiocyanatopropyltriethoxysilane), a determination of chlorine in the case of chlorine-containing silanes (e.g. 3-chloropropyltriethoxysilane) and in the case of silanes containing alkyl and alkenyl (e.g. propyltriethoxysilane, octyltriethoxysilane, hexadecyltrimethoxysilane, triethoxyvinyl silane, butenyltriethoxysilane), the ashing residue is determined.

A silane was selected as a representative for each of the four groups and its bondable amount was determined on carbon blacks which were likewise selected as representatives.

| Designation | $N_2$ surface | DBP | bondable amount of silane in parts by weight on 100 parts by weight carbon black |
|---|---|---|---|
| carbon black/ polysulfide silane | | | |
| PRINTEX ® 90/Si 69 | 300 | 800 | 4.7 |
| CORAX ® N110/Si 69 | 145 | 114 | 3.3 |
| CORAX ® N220/Si 69 | 115 | 114 | 2.7 |
| CORAX ® N234/Si 69 | 125 | 125 | 2.3 |
| CORAX ® N375/Si 69 | 96 | 114 | 2.4 |
| CORAX ® N330/Si 69 | 82 | 102 | 1.7 |
| CORAX ® N326/Si 69 | 83 | 72 | 2.1 |
| CORAX ® N550/Si 69 | 42 | 121 | 1.5 |
| CORAX ® N660/Si 69 | 35 | 90 | 1.7 |
| CORAX ® N683/Si 69 | 37 | 133 | 0.9 |
| CORAX ® N765/Si 69 | 35 | 122 | 0.8 |
| DUREX ® 0/Si 69 | 20 | 104 | 0.4 |
| Sulfur-containing silanes | | | |
| CORAX ® N539/Si 264 | 41 | 111 | 1.8 |
| CORAX ® N550/Si 264 | 42 | 121 | 3.7 |
| CORAX ® N683/Si 264 | 37 | 133 | 1.7 |
| Chlorine-containing silane | | | |
| CORAX ® N330/Si 230 | 82 | 102 | 0.9 |
| CORAX ® N539/Si 230 | 41 | 111 | 0.9 |
| CORAX ® N683/Si 230 | 37 | 133 | 0.6 |
| Silanes containing alkenyl groups | | | |
| CORAX ® N550/Si 221 | 42 | 121 | 0.7 |
| CORAX ® N439/Si 221 | 41 | 111 | 0.7 |
| PRINTEX ® XE-2/Si 221 | 1000 | 400 | 5.3 |

III. Comparison between N110 and Si 69 modified N111 in a truck tread based on NR

| | 1 | 2 |
|---|---|---|
| RSS 1 ML (1 + 4) = 70–80 | 100 | 100 |
| CORAX ® N110 | 45 | — |
| Si 69 mod. N110 | — | 45 |
| ZnO RS | 4 | 4 |
| Stearic acid | 3 | 3 |
| Naftolen ZD | 5 | 5 |
| Protector G 35 | 1.5 | 1.5 |
| Vulkanox 4010 NA | 2 | 2 |
| Vulkanox HS | 1 | 1 |
| Vulkacit MOZ | 1.18 | 1.18 |
| Sulfur | 1.07 | 1.07 |
| Rheometer: 145° C. | | |
| $D_{min}$ (Nm) | 0.93 | 0.93 |
| $D_{max} - D_{min}$ (Nm) | 7.10 | 7.54 |
| $t_{10\%}$ (min) | 12.7 | 11.1 |
| $t_{90\%}$ (min) | 20.8 | 20.1 |
| $t_{90\%} - t_{10\%}$ (min) | 8.1 | 9.0 |
| Reversion (%) | 2.5 | 2.4 |
| Mooney viscosity | | |
| ML (1 + 4) (100° C.) (ME) | 75 | 76 |
| Vulcanizate properties: 145° C., $t_{95\%}$ | | |
| Tensile strength (MPa) | 24.6 | 28.5 |
| Modulus 100% (MPa) | 1.7 | 2.0 |
| Modulus 200% (MPa) | 4.4 | 5.1 |
| Modulus 300% (MPa) | 8.4 | 10.0 |
| Breaking elongation (%) | 580 | 610 |
| Breaking energy (J) | 18.4 | 22.9 |
| Ball rebound (%) | 42.2 | 44.9 |
| Shore A hardness (—) | 62 | 64 |
| Abrasive wear (mm³) | 104 | 96 |
| Goodrich flexometer: (RT, 108 N, 0.175 inch, 18 h) | | |
| Delta T center (°C.) | 112.5 | 89.0 |
| Dyn. compression (%) | 34.7 | 27.2 |
| MTS test | | |
| Dyn. modulus of elasticity E* (MPa) | | |
| 0° C. | 11.9 | 12.2 |
| 60° C. | 7.5 | 8.1 |
| Loss angle tan δ | | |
| 0° C. | 0.254 | 0.241 |
| 60° C. | 0.138 | 0.122 |

The example shows that silane-modified carbon blacks result in clearly improved values in the cross-linking yield, modulus, tensile strength, elasticity, in the dynamic data and in the loss angle tan δ in comparison to the control [null] mixture.

IV. Comparison between PRINTEX 90 and Si 69 modified PRINTEX 90 in a truck tread based on NR

| | 1 | 2 |
|---|---|---|
| RSS 1 ML (1 + 4) = 70–80 | 100 | 100 |
| PRINTEX 90 | 45 | — |
| Si 69 mod. PRINTEX 90 | — | 45 |
| ZnO RS | 4 | 4 |
| Stearic acid | 3 | 3 |
| Naftolen ZD | 5 | 5 |
| Protector G 35 | 1.5 | 1.5 |

-continued

|  | 1 | 2 |
|---|---|---|
| Vulkanox 4010 NA | 2 | 2 |
| Vulkanox HS | 1 | 1 |
| Vulkacit CZ | 1.18 | 1.18 |
| Sulfur | 1.07 | 1.07 |
| Rheometer: 145° C. | | |
| $D_{min}$ (Nm) | 1.23 | 1.31 |
| $D_{max} - D_{min}$ (Nm) | 6.30 | 7.00 |
| $t_{10\%}$ (min) | 14.2 | 10.3 |
| $t_{90\%}$ (min) | 22.1 | 20.7 |
| $t_{90\%} - t_{10\%}$ (min) | 8.0 | 10.4 |
| Reversion (%) | 4.8 | 2.4 |
| Mooney viscosity | | |
| ML (1 + 4) (100° C.) (ME) | 71 | 78 |
| Vulcanizate properties: 145° C., $t_{95\%}$ | | |
| Tensile strength (MPa) | 24.8 | 24.5 |
| Modulus 100% (MPa) | 1.1 | 1.4 |
| Modulus 200% (MPa) | 2.0 | 2.8 |
| Modulus 300% (MPa) | 3.8 | 5.0 |
| Breaking elongation (%) | 740 | 670 |
| Tear resistance (N/mm) | 37 | 40 |
| Ball rebound (%) | 43.3 | 48.6 |
| Shore A hardness (—) | 59 | 61 |
| Abrasive wear (mm³) | 152 | 145 |
| Goodrich flexometer: (RT, 108 N, 0.175 inch, 18 h) | | |
| Delta T center (°C.) | 126.1 | 87.0 |
| Dyn. compression (%) | 40.0 | 27.0 |
| MTS test | | |
| Dyn. modulus of elasticity E* (MPa) | | |
| 0° C. | 9.9 | 10.3 |
| 60° C. | 6.4 | 7.2 |
| Loss angle tan δ | | |
| 0° C. | 0.249 | 0.219 |
| 60° C. | 0.131 | 0.117 |

This example also shows the rubber properties in the case of a silane-modification of the carbon black, which are clearly improved in comparison to the control mixture.

V. Comparison of DUREX 0 and Si 69 modified DUREX 0 in a rubber form article mixture based on NR

|  | 1 | 2 |
|---|---|---|
| RSS 1 ML (1 + 4) = 70-80 | 100 | 100 |
| DUREX 0 | 45 | — |
| Si 69 modified DUREX 0 | — | 45 |
| ZnO RS | 4 | 4 |
| Stearic acid | 2 | 2 |
| Naftolen ZD | 4 | 4 |
| Vulkanox HS | 2 | 2 |
| Vulkanox 4020 | 1 | 1 |
| Vulkacit MOZ | 0.8 | 0.8 |
| Sulfur | 2.5 | 2.5 |
| Rheometer: 155° C. | | |
| $D_{min}$ (Nm) | 0.31 | 0.33 |
| $D_{max} - D_{min}$ (Nm) | 10.19 | 10.89 |
| $t_{10\%}$ (min) | 7.9 | 7.1 |
| $t_{90\%}$ (min) | 12.2 | 11.4 |
| $t_{90\%} - t_{10\%}$ (min) | 4.4 | 4.3 |
| Vulcanizate properties: 155° C., $t_{95\%}$ | | |
| Tensile strength (MPa) | 18.2 | 18.4 |
| Modulus 100% (MPa) | 3.0 | 3.3 |
| Modulus 200% (MPa) | 6.3 | 6.6 |
| Modulus 300% (MPa) | 9.9 | 10.2 |
| Breaking elongation (%) | 490 | 480 |
| Shore A hardness (—) | 62 | 63 |
| Goodrich flexometer: (RT, 108 N, 0.175 inch, 18 h) | | |
| Delta T center (°C.) | 64.3 | 63.4 |
| Dyn. compression (%) | 13.6 | 11.4 |
| MTS test | | |
| Dyn. modulus of elasticity E* (MPa) | | |
| 0° C. | 8.4 | 9.3 |
| 60° C. | 7.4 | 8.6 |
| Loss angle tan δ | | |
| 0° C. | 0.140 | 0.131 |
| 60° C. | 0.059 | 0.053 |

In spite of the very slight amount of Si 69 which can be bonded to DUREX 0 (0.4 parts by weight), clear advantages are apparent between the control mixture and the silane-modified carbon black.

VI. Comparison between silane-modified carbon black in the case in which the applied amount of silane corresponds precisely to the bondable amount and between a silane-modified carbon black in the case in which an excess of silane was used.

|  | 1 | 2 |
|---|---|---|
| RSS 1 ML (1 + 4) = 70-80 | 100 | 100 |
| N110/Si 69 (3.3 parts by wt. Si 69 to 100 parts by wt. N110) | 46.5 | — |
| N110/Si 69 (6.7 parts by wt. Si 69 to 100 parts by wt. N110) | — | 48 |
| ZnO RS | 4 | 4 |
| Stearic acid | 3 | 3 |
| Protector G 35 | 1.5 | 1.5 |
| Vulkanox 4010 NA | 2 | 2 |
| Vulkanox HS | 1 | 1 |
| Naftolen ZD | 5 | 5 |
| Vulkacit MOZ | 1.12 | 1.18 |
| Sulfur | 1.07 | 1.07 |
| Rheometer: 145° C. | | |
| $D_{max} - D_{min}$ (Nm) | 7.92 | 7.84 |
| $t_{10\%}$ (min) | 10.6 | 13.2 |
| $t_{95\%}$ (min) | 29.1 | 46.7 |
| $t_{90\%} - t_{10\%}$ (min) | 12.1 | 21.8 |
| Vulcanizate properties: 145° C., $t_{95\%}$ | | |
| Tensile strength (MPa) | 26.0 | 25.9 |
| Modulus 300% (MPa) | 9.2 | 8.8 |
| Tear resistance (N/mm) | 34 | 29 |
| Shore A hardness (—) | 64 | 64 |
| Goodrich flexometer: (RT, 108 N, 0.175 inch, 18 h) | | |
| Delta T center (°C.) | 87.6 | 101.3 |
| Dyn. compression (%) | 20.7 | 22.3 |

The example shows that the rubber properties deteriorate if there is an excess of the silane is used above the amount which can be bonded to N110. This is particularly noticeable in the kinetic data (very slow vulcanization speed) and in the dynamic data (delta T center increases).

VII. Comparison between Si 60 modified N 375 and a Si 69/N 375 50:50 mixture in a passenger car tread based on SBR

|  | 1 | 2 |
|---|---|---|
| Buna 1500 | 60 | 60 |
| Buna 1712 | 55 | 55 |
| N 375 | — | 68.3 |
| Si 69 mod. N 375 | 71.7 (= 1.7 Si 69) | — |
| Si 69/N 375 (50:50) | — | 3.4 |
| ZnO RS | 3 | 3 |
| Stearic acid | 2 | 2 |
| Naftolen ZD | 12 | 12 |
| Vulkanox 4010 NA | 1.5 | 1.5 |
| Vulkanox HS | 1 | 1 |
| Protector G 35 | 1 | 1 |
| Vulkacit CZ | 2 | 2 |
| Sulfur | 1.8 | 1.8 |

-continued

|  | 1 | 2 |
|---|---|---|
| Rheometer: 175° C. | | |
| $t_{10\%}$ (min) | 5.4 | 5.2 |
| $t_{10\%}$ (min) | 6.1 | 8.5 |
| $t_{90\%} - t_{10\%}$ (min) | 2.4 | 2.4 |
| Mechanical properties: 175° C. $t_{95\%}$ | | |
| Tensile strength (MPa) | 20.3 | 19.0 |
| Modulus 300% (MPa) | 13.3 | 11.4 |
| Hardness | 71 | 69 |
| Abrasive wear (mm³) | 62 | 76 |
| Loss angle tan δ 60° C. | 0.216 | 0.228 |
| Dyn. modulus of elasticity (MPa) | | |
| 0° C. | 42.0 | 39.1 |
| 60° C. | | |

This example shows that the use of the silane-modified carbon blacks result sin altogether improved rubber properties in the vulcanizates. This also applies to the following example, which relates to EPDM/NR.

VIII. Comparison between Si 69/modified N 556 and an Si 69/N 550 50:50 mixture in an EPDM/NR profile mixture

|  | 1 | 2 |
|---|---|---|
| Buna AP 451 | 40 | 40 |
| SMR CV | 60 | 60 |
| ZnO RS | 5 | 5 |
| Stearic acid | 2 | 2 |
| N 550 | — | 68.65 |
| Si 69 modified N 550 | 71.35 | — |
| Si 69/N 550 | — | 2.7 |
| Sunpar 2280 | 25 | 25 |
| Structol 60 NS | 10 | 10 |
| Vulkacit L | 1 | 1 |
| Vulkacit CZ | 0.65 | 0.65 |
| Vulkacit DM | 0.6 | 0.6 |
| Sulfur | 1 | 1 |
| Kinetics: 160° C. | | |
| $t_{10\%}$ (min) | 1.3 | 14.5 |
| $t_{90\%}$ (min) | 5.9 | 14.5 |
| $t_{90\%} - t_{10\%}$ (min) | 4.7 | 13.1 |
| Mechanical properties: 160° C., $t_{95\%}$ | | |
| Tensile strength (MPa) | 7.8 | 7.3 |
| Modulus 200% (MPa) | 6.9 | 6.5 |
| Compression set | | |
| 100 h/23° C. (%) | 12.1 | 13.4 |
| 100 h/70° C. (%) | 34.6 | 36.1 |

What is claimed is:

1. Carbon blacks which are chemically modified with at least one organosilicon compound selected from the group consisting of $$[R^1_n (RO)_{3-n} \text{Si-(Alk)}_m\text{-(Ar)}_p]q [B] \quad (I)$$

$$R^1_n (RO)_{3-n} \text{Si-(Alkyl)} \quad (II)$$

$$R^1_n (RO)_{3-n} \text{Si-(Alkenyl)} \quad (III)$$

in which

B represents —SCN, —SH, —Cl, —NH₂ (if q=1) or —Sx—(if q=2),

R and R¹, which may be the same or different, represent an alkyl group containing 1 to 4 carbon atoms or the phenyl group, q represents 1 or 2, n represents 0, 1 or 2, Alk represents a bivalent straight or branched hydrocarbon group containing 1 to 6 carbon atoms, m represents 0 or 1, Ar represents an arylene group containing 6 to 12 carbon atoms, p represents 0 or 1 provided that p and n do not simultaneously signify 0, x represents a number from 2 to 8, Alkyl represents a monovalent straight or branched unsaturated hydrocarbon group containing 1 to 20 carbon atoms, alkenyl represents a monovalent straight or branched unsaturated hydrocarbon group containing 2 to 20 carbon atoms, and on the surface of which blacks 0.1 to 15 % by weight of one or more of the named organosilicon compounds are bonded in such a manner that they can not be extracted with organic solvents.

2. Modified carbon blacks as set forth in claim 1 which exist in powder form, pellet form or as a granulate.

3. A method of producing the modified carbon blacks set forth in claim 1 or claim 2 which comprises forming a homogeneous mixture of at least one said organosilicon compound and the carbon black, then subsequently reacting said at least one organosilicon compound for 1 to 60 min. at 50° to 160° C. and then extracting any of said at least one organosilicon compound which is not reacted with an organic solvent.

4. A method according to claim 3 including pelletizing powdered modified carbon black or converting it into a granulate.

5. A method as set forth in claim 3 in which all of said organosilicon compound is reacted with said carbon black and none is extracted.

6. A vulcanizable rubber mixture comprising a vulcanizable rubber and a modified carbon black as set forth in claim 1 or claim 2.

7. Carbon blacks according to claim 1, wherein Ae contains 6 carbon atoms, Alkyl contains 2 to 8 carbon atoms and alkenyl contains 2 to 8 carbon atoms.

* * * * *